Sept. 8, 1970  W. R. TOWNSEND, JR  3,527,371
SNOWMOBILE CARRIER APPARATUS FOR MOTOR VEHICLES
Filed Oct. 16, 1968  2 Sheets-Sheet 1

INVENTOR.
WARREN R. TOWNSEND JR.
ATTORNEYS

Sept. 8, 1970   W. R. TOWNSEND, JR   3,527,371
SNOWMOBILE CARRIER APPARATUS FOR MOTOR VEHICLES
Filed Oct. 16, 1968   2 Sheets-Sheet 2
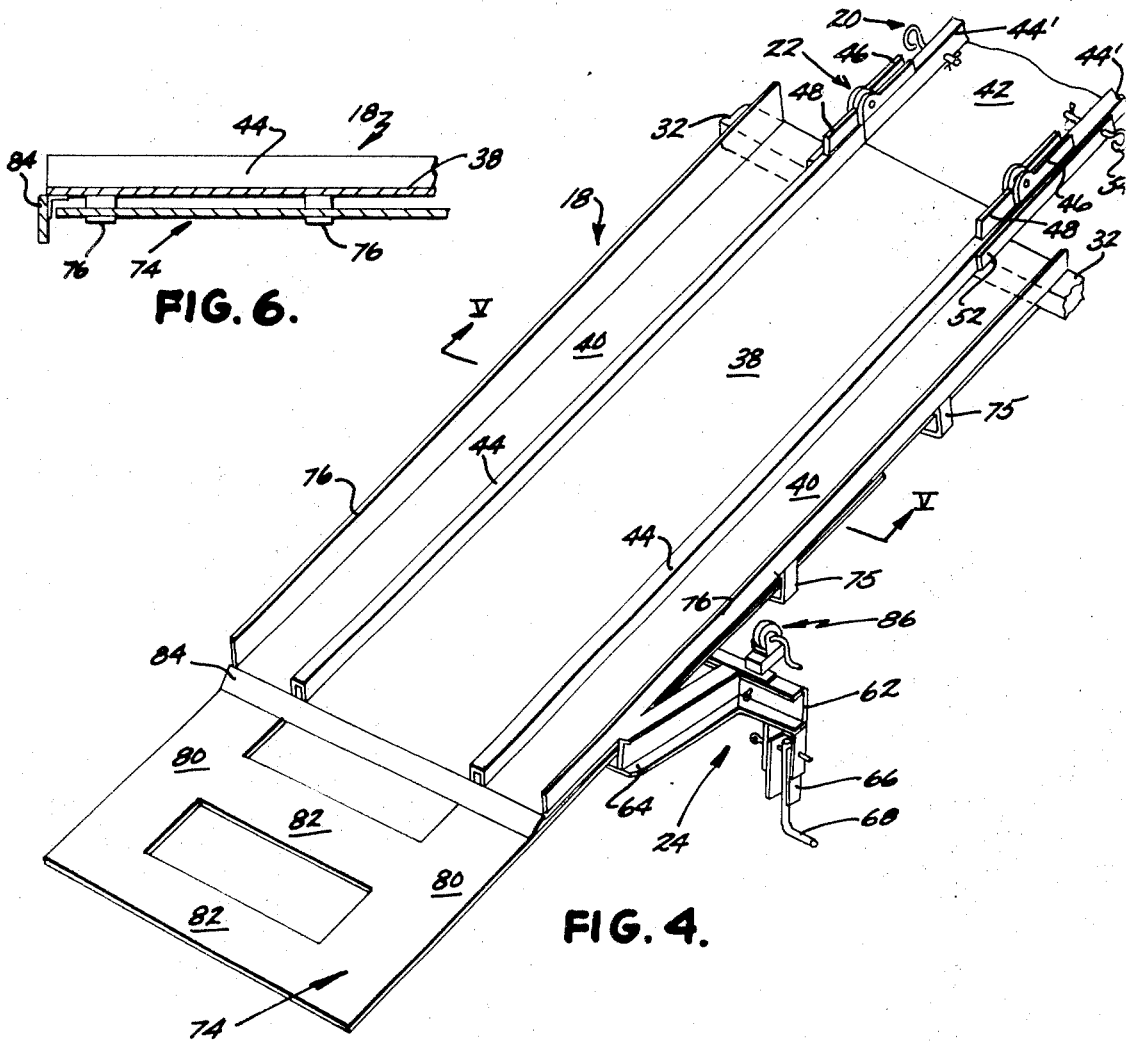
FIG. 6.
FIG. 4.
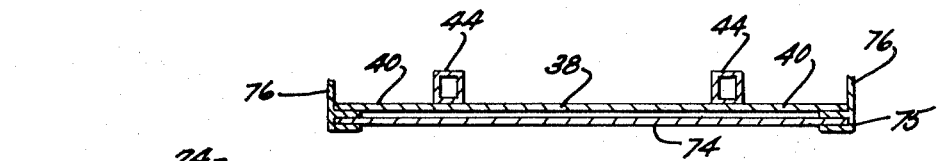
FIG. 5.
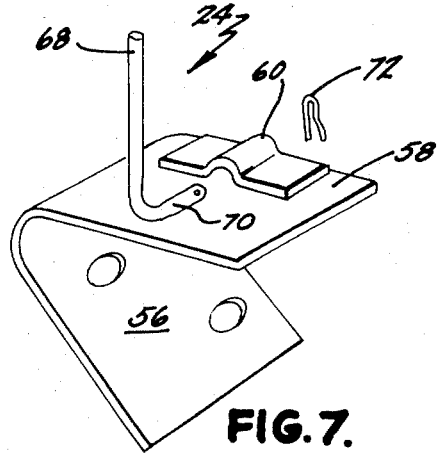
FIG. 7.
INVENTOR.
WARREN R. TOWNSEND JR.
BY
ATTORNEYS United States Patent Office 3,527,371
Patented Sept. 8, 1970

3,527,371
SNOWMOBILE CARRIER APPARATUS FOR MOTOR VEHICLES
Warren R. Townsend, Jr., 1200 S. 96th Ave., Zeeland, Mich. 49464
Filed Oct. 16, 1968, Ser. No. 768,141
Int. Cl. B60r 9/06, 9/08
U.S. Cl. 214—450                               25 Claims

ABSTRACT OF THE DISCLOSURE

A generally flat and rigid support deck and means for mounting the same atop the rearward extremity of an automobile, at a downward slope toward the rear of the auto, so that the heavy forward part of the snowmobile is disposed low and well toward the rear of the vehicle carrying the same; also, the support deck is hinged intermediate its ends and is pivotally attached to the rear of the auto, so that it may be swung out of the way of the luggage compartment. The support deck includes trackways for the runner portions of the snowmobile and a trackway for the drive belt or other such member thereof, and rails are provided atop the support deck for guiding the snowmobile runners and drive member into place on their respective trackways, and for maintaining such positioning during movement of the auto.

BACKGROUND

Snowmobile riding is rapidly and steadily gaining in popularity in this country in recent years, and in fact this relatively new pastime or sport has already become a major winter activity in many sections of the country. For the most part, snowmobile owners and operators have to transport their machines to particular rural or other open areas in order to take part in the most enjoyable and most preferred type of snowmobile activities. For example, snowmobile rallies are now planned at numerous places on many if not most weekends of the winter season, and people travel considerable distances to take part in these events. Also, there are other types of activities, such as surprisingly lengthy nature study and wilderness trails maintained by state and other governmental units, and also similar trails operated privately for profit. In fact, some of the latter types of places even have guest accommodations, similar to ski lodges.

In any event, frequent transporting of the snowmobile is practically a prerequisite to full enjoyment of the same, and in the past this has only been possible by using either pickup trucks or other similar vehicles, typically outfitted with special mounting equipment for anchoring the snowmobile in place, or special snowmobile trailers somewhat on the order of boat trailers and having special equipment designed for use with a particular type or brand of snowmobile. This factor has definitely created a problem in the past, inasmuch as few snowmobile owners are willing or able financially to purchase a truck solely for use in transporting the snowmobile, and fewer still already happen to own a truck when purchasing the snowmobile. Consequently, the snowmobile trailer is by far the most frequently used vehicle, since these can be removably coupled to the family automobile. However, such trailers involve a significant added expense, and they also are not really easy or convenient to use. Also, they present an added storage problem, since they require practically as much room as an automobile for inside storage.

Thus, a genuine and deeply-felt need has come to exist for some other means of more conveniently transporting the snowmobile; however, until the present invention there has been no answer to this need.

THE PRESENT INVENTION

In accordance with the present invention, a carrier is provided by which practically all presently-known types of snowmobiles can be carried atop an ordinary automobile, above and in the area of the rearwardmost portion of the auto. A great many advantages are attained in this mnner, since the carrier is much more economical to manufacture and therefore may be sold at retail for less than a complete trailer, and the carrier is far easier to store when not in use. Also, an automobile is much easier to drive and handle with a carrier-mounted snowmobile than with a trailer; that is, the vehicle can be safely and lawfully driven at significantly higher highway speeds than is true when a trailer is in tow, and cornering of the vehicle is very much better than when towing a trailer. Further, passing other autos on the highway is far easier than when pulling a trailer, and backing up and parking are both immeasurably easier.

Numerous other and additional advantages provided by the invention will no doubt suggest themselves to those skilled in and concerned with the pertinent subject matter upon considering more fully the nature of the present device which, briefly stated, comprises a support deck or platform means including mutually hinged primary and secondary portions, of which the primary portion has a pair of spaced, generally rigid trackways for receiving and supporting the runner means of the snowmobile, and of which the secondary portion has a different trackway aligned between the primary trackways, for receiving and supporting the snowmobile drive means. Mounting means attached to the support deck and disposed generally beneath the same serve to attach it to an auto in a manner whereby the primary portion of the support deck is suspended immediately above the bumper, at the extreme rear of the auto, and at a relatively low position from which the remainder of the support deck angles upwardly toward the top of the automobile, whereby the center of gravity of the snowmobile is placed at as low a position as possible.

IN THE DRAWINGS

FIG. 4 is an enlarged, fragmentary perspective view of the carrier alone;

FIG. 5 is an enlarged sectional elevation through the vertical plane V—V of FIG. 4;

FIG. 6 is an enlarged, fragmentary side elevation of the lower extremity of the carrier; and FIG. 7 is a further enlarged fragmentary perspective view of the mounting apparatus.

PREFERRED EMBODIMENT

Figure 1:
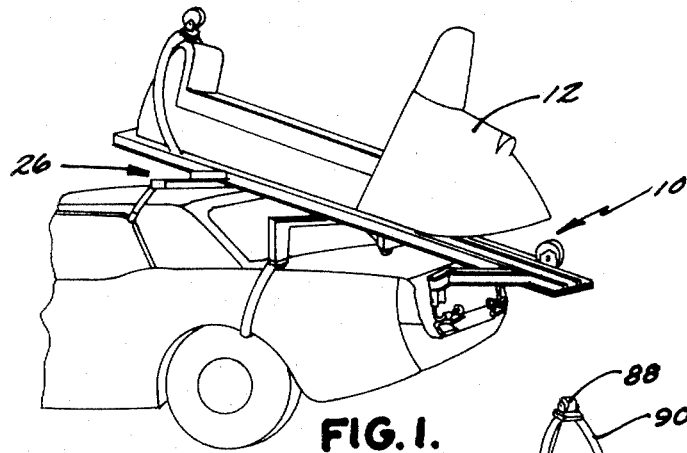
FIG. 1 is a fragmentary perspective view of the carrier in place upon an auto, showing the relative positioning of a snowmobile carried thereon.
Figure 2:
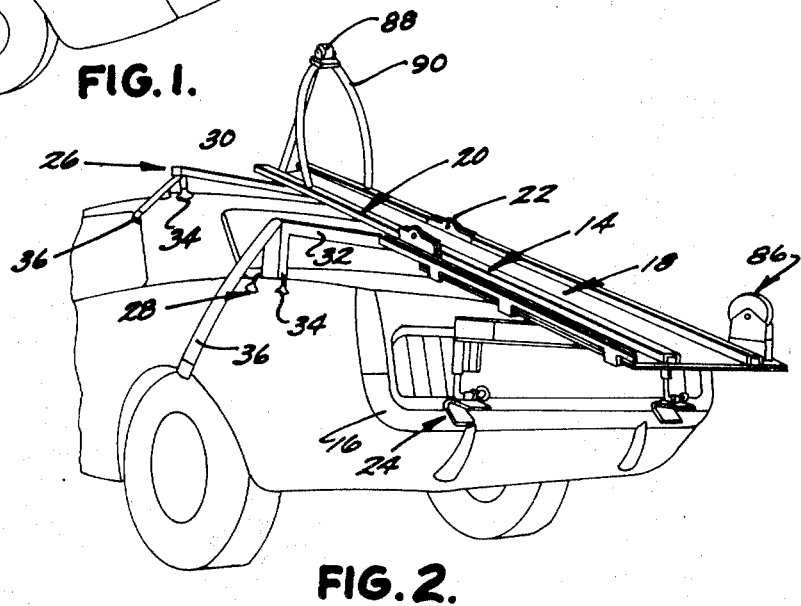
FIG. 2 is a fragmentary perspective view similar to FIG. 1 but without the snowmobile.

Referring now in more detail to the drawings, the carrier 10 of the invention is seen in its mounted position atop an auto in FIGS. 1 and 2, with FIG. 1 showing the positioning of a typical snowmobile 12 located on the carrier. The carrier 10 comprises basically an elongated support deck 14 which is detachably mounted to the automobile at a downwardly-sloping orientation with respect to the horizontal, i.e., downwardly from the roof toward the rear bumper 16. The support deck 14 comprises a lower or primary portion 18 which is located at the extreme rear of the auto, and a secondary portion 20 disposed upwardly and forwardly of the aforesaid primary portion, attached to the latter by hinge means 22.

When in the ready position upon the automobile, the primary and secondary portions are substantially coplanar and generally flat, with a first or lower support means 24 securing the primary portion to the bumper 16, with a second or upper support means 26 supporting the secondary portion 20 on the roof of the auto, and with an intermediate support means 28, disposed in proximity to the hinges 22, supporting the central part of the carrier above the trunk of the automobile. As indicated, the upper support 26 and the intermediate support 28 may consist of bar-like support members 30, 32 disposed transversely of the support deck 14 (and preferably rigidly secured thereto), with resilient or other feet or pads 34, which may advantageously be rubber or other suction cups, supporting the aforesaid bars in place above the associated part of the automobile. Preferably, each end of the aforesaid support bars 30, 32 is secured against lateral shifting movement with respect to the automobile, as by anchor straps 36 having clasping or hooking end portions adapted to engage the rain guttering and the edge of the wheel well or fender, respectively, of the auto on which the carrier is mounted.

Basically, both the primary and secondary portions 18, 20 of the support deck 14 are generally flat plate-like members, preferably formed from a generally rigid sheet of metal openwork, such as expanded metal, perforated metal plate, grating, or the like, the primary requisites of which are a relatively high degree of rigidity and structural strength combined, but with as little total weight as possible. As illustrated, the primary portion 18 is wider than the secondary portion 20 and includes both a central trackway 38 and a lateral trackway 40 on either side of the central trackway, whereas the secondary portion 20 of the support deck has only a central trackway 42 corresponding in width and forming a direct extension of the central trackway 38 of the primary portion.

The central and lateral trackways 38, 40 are separated by a pair of spaced rails or rib elements 44, which may be of tubular metal or angle stock of considerable lengthwise rigidity or bending strength. These rails are rigidly secured atop the primary deck portion 18, and thus serve as structural reinforcing members as well as to define the spaced trackways or areas on which the skis or other such runners at the front of the snowmobile 12 will rest when the same is mounted atop the carrier. The two aligned central trackways 38, 42 receive and carry the drive means of the snowmobile, which is typically a relatively wide belt driven by powered rollers or wheels, referred to generally herein as the drive means of the snowmobile. That is, the drive belt or other such roller member fits between the two spaced rails 44, extensions 44' of which are secured along the edges of the secondary portion 20 (FIG. 4).

At the junction of the primary and secondary portions 18, 20, the hinge means 22 joining these portions comprises a pair of spaced knuckles or hinge members 46 secured atop the rail extensions 44', and a similar hinge member 48 secured atop the rails 44, with a pintle or hinge pin 50 passing through the two different such hinge members (FIG. 4). Also, an elongated strap 52 of a rigid nature is secured on the outward side of each of the rails 44, extending across the juncture between these rails and their extensions 44', fitting closely alongside the latter but not actually being secured thereto. These straps each have an aperture in their uppermost end which lies in registration with a similar aperture extending transversely through each of the rail extensions 44' when the rails and rail extensions (and the primary and secondary deck portions) are in longitudinal alignment. A lock pin 54 is inserted through each set of these registering apertures to interlock the two support deck portions in this aligned configuration and to prevent undesired hinging thereof.

Figure 3:
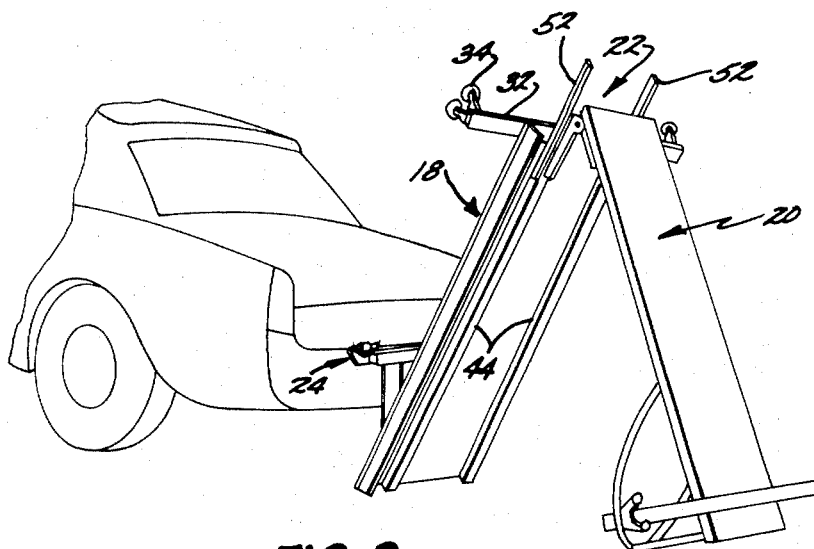
FIG. 3 is a fragmentary perspective view illustrating the pivotal and hinging nature of the carrier.

However, when it is desired to hinge or pivotally move these two portions with respect to each other, all that is required is to pull the lock pins 54 from the position just indicated, whereupon the entire secondary deck portion 20 may freely pivot upwardly and around the hinge pin 50 of hinge 22, toward, and ultimately against, the primary deck portion 18 (FIG. 3).

The pivotal or hinging nature of the first support means 24 noted previously, is more clearly observable in FIGS. 3, 4 and 7. Basically, this support means comprises an anchor element 56 which is rigidly attached to the bumper of the auto in any desired manner, typically by bolting. The lowermost extremities of this element may have any specific desired form, depending on the shape of the bumper against which it is to be fitted, but the uppermost extremities should preferably define a generally horizontal load-bearing shelf or table 58 (FIG. 7), having a passage-forming structure thereon such as the U-shaped bracket 60 illustrated.

Rigidly secured transversely across the underside of the primary deck portion 18 is a strong and rigid crossbar 62 (FIG. 4) having attachment braces 64 for rigidifying and strengthening the attachment of the cross-bar to the support deck. Depending downwardly from each end of the cross-bar 62 is a rigid leg or strut 66 which carries a downwardly-depending L-shaped attachment pin 68 of generally circular cross section. It is to be noted that, in order to more readily accommodate the carrier to the wide variety of different automobiles presently manufactured, the three support means 24, 26 and 28 should all be made to be adjustable both laterally and vertically. Lateral adjustment may readily be provided by making the cross-bars 30, 32 and 62 of telescoping construction, as by using interfitting tubular or channel members, and including a series of registrable holes through which a locking pin may be passed to maintain a particular desired adjusted position. This same basic arrangement may also be used for the vertical struts at the ends of the cross-members, so that the correct mounting position of the carrier, as illustrated in FIGS. 1 and 2, may be achieved regardless of the particular configuration of the auto to which it is mounted.

Each of the attachment pins 68 of the lowermost support means 24, mentioned above, has a generally horizontal foot portion 70 (FIG. 7) which is adapted to slide into the passage formed by one of the U-shaped brackets 60, where it may be retained in place by a lock pin or key 72. Each of the feet 70 of the attachment pins 68 is oriented to point in the same lateral direction, so that in attaching the carrier to the automobile all that is required is to position the carrier generally as indicated in FIG. 3, lower the feet 70 onto the top of the shelf of table portion 58 of the anchor elements, manipulate the primary deck portion about until both of the feet 70 are aligned with the mounting passage of their respective U-shaped bracket 60, and then slide the entire structure sideways, so that both feet pass into their mounting passages. As will be appreciated, this is a feature of considerable convenience and importance, since none of the weight of the carrier need be supported by the operator while he is manipulating the device into the proper position and engaging the attachment pins. Also, once the pins are engaged within their respective passages, and secured against disengagement by the lock pins 72, an easily pivotal attachment is provided, whereby the entire support deck 14 may easily be pivoted on the attachment pins upwardly and into position on top of the trunk and roof of the automobile.

It is to be noted that the nature of the attachment pins 68 allows for the use of small wheels (not specifically shown) at the bottom of the apparatus for making it more maneuverable and easier to handle when not mounted upon an auto. That is, wheels having an axle passage easily receiving the feet 70 may quickly be slipped into place thereupon when the feet are not engaged in the brackets 60, and retained by the lock pins 72 in an easily removable manner.

The primary deck portion 18 carries a loading ramp device 74 (FIGS. 4, 5, and 6), which is slung beneath it on rightangle brackets 75. As illustrated, these form downwardly extensions of outer rails 76 secured along the side edges of the primary deck portion 18 (FIGS. 4 and 5) and rigidly affixed the attachment braces 64 noted previously. The loading ramp 74 is a flat structure having essentially the same width as the primary deck portion 18, and it includes a pair of elongated trackway portions 80 which extend lengthwise along each side of it. These trackway portions form in effect extensions of the spaced lateral trackways 40 of the support deck when the loading ramp is extended outwardly of the primary deck portion by sliding upon its brackets 76. As will be evident, the overall length of the loading ramp must be at least slightly longer than the distance from the lower end of the primary deck portion 18 to ground level when the carrier is mounted on the auto, since the purpose of the loading ramp is to provide a runway on which the snowmobile may travel upwardly to be loaded on the carrier. In addition to the spaced trackway-forming side members 80, the loading ramp 74 also includes a series of central brace portions 82 which interconnect the longitudinal members 80 and which also in effect provide an extension of the central trackway 38, to receive and guide the drive member of the snowmobile when the same is loaded on the carrier.

As stated above, the loading ramp 74 is slidably held by the angle brackets 75 along the sides of the support deck, so as to be extendible and retractable beneath the latter. Since the entire support deck 14, including the lower or primary portion 18 thereof, is disposed at an angle with respect to the horizontal, it is desirable to provide a retaining or locking means for keeping the loading ramp in its fully retracted position beneath deck portion 18 when not intentionally extended therefrom for use in loading a snowmobile. Any desired means may be used for the last-stated purpose, including, for example, a pin insertable downwardly through registering apertures formed in the lower deck and the loading ramp. However, for the most convenient loading operation it is desirable to have a small ramp-like transition member bridging the lower end extremity of the lower deck 18 and the upper surface of the loading ramp, since this greatly facilitates the sliding of the skis or runners of the snowmobile from the ramp upwardly onto the lower deck portion in loading the snowmobile on the carrier. Such a transition ramp may advantageously be provided by a relatively narrow, generally rectangular flap member 84 (FIGS. 4 and 6) hinged or otherwise pivotally attached across the lower end extremity of the lower deck 18, where gravity will normally hold it in the position shown in FIG. 6, concealing the end of the loading ramp 74. When the loading ramp is intentionally extended outwardly from the lower support deck, the hinged flap member 84 will automatically be swung upwardly into a ramp-like position wherein the lowermost edge of the flap slides along the top of the loading ramp and effects a smooth interconnecting surface therebetween which the rear edge of the skis or runners of a snowmobile will easily slide over, both while moving upwardly and downwardly. Furthermore, the hinged member 84 can easily be locked in its normal downwardly-hanging position seen in FIG. 6, in order to hold the loading ramp in its fully retracted position and avoid the necessity of using the above-mentioned pin. As will be evident, any of a wide variety of mechanical latches or locking pins could easily be used for this purpose.

The manner of using the carrier provided by the present invention will likely be apparent after studying the foregoing disclosure. By virtue of the central hinge 22 in the support deck 14, the carrier will stand by itself, without falling, when the upper and lower decks are angularly pivoted into the position shown in FIG. 3. In this position, the lower support means 24 is readily connectable to the auto in the manner already described, following which the support deck is swung counterclockwise about the mount 24 until the lower support deck 18 has assumed its proper position, at which point the intermediate support means 28 will be in contact with the automobile, normally at the trunk lid or atop the rear fenders. Following this, the upper support deck 20 is pivoted with respect to the lower deck upon hinge means 22, until both of the support deck portions are longitudinally aligned and generally coplanar, at which point the upper support means 26 is in contact with the roof of the automobile.

At this point, the loading ramp 74 is slid downwardly and outwardly with respect to the support deck, until the lower end of the loading ramp contacts the ground. The snowmobile is then positioned immediately behind the lowered loading ramp, in a back-to-back relation with respect to the automobile. A loading cable or the like (not specifically shown) mounted upon and entrained about the drum of a lower winch means 86 (FIGS. 1, 2 and 4) and extending upwardly around a pulley wheel 88 located atop the upper bracing elements 90 is attached to the rear of the snowmobile in a desired manner, as by a hook or the like, and the winch 86 is operated to pull the snowmobile backwardly up the loading ramp and into position on the support deck. As will be understood, in accomplishing this the snowmobile drive belt or other such means passes upwardly on the central trackway 38, between the rails 44, and thence up the central trackway 42. At the same time, when the front of the snowmobile reaches the lower extremity of the lower support deck 18, the central rails 44 and the outer rails 76 will act as guides in properly positioning the skis conventionally found at the front of the snowmobile within the spaced trackways 40.

After the snowmobile is loaded, both the inner rails 44 and the outer rails 76 will maintain the snowmobile in proper lateral position, since they will prevent the runners or skis from being slid sideways on the lower support deck. Also, the rail extensions 44' will prevent the drive belt from being slid sideways on the upper support deck. By locking the winch 86 with the snowmobile loaded and in place; the snowmobile will be held in the desired position; however, it is preferable to have a secondary such retaining means, and this can advantageously be provided by a loop of chain passing around the strut for the skis at the front of the snowmobile and attached to outside rails 76, or to the lower support means 24 of the carrier. Of course, when the snowmobile is fully loaded as shown in FIG. 1, the loading ramp 74 is slid upwardly into position and secured in place.

Thus, the loading of the snowmobile is extremely simple and surprisingly rapid. Furthermore, it is surprisingly easy, and can readily be accomplished even by relatively young persons. When loaded upon the carrier, the snowmobile will ride very securely, and the distribution of its weight will not unduly affect the handling characteristics of most automobiles, inasmuch as the heavy forward end of the snowmobile is low with respect to the ground and well toward the rear of the automobile. Also, the inclined mounting attitude of the snowmobile minimizes wind resistance to a marked degree, so that the wind resistance is considerably less than that typically encountered with car-top boat carriers and the like. Furthermore, during the time that the snowmobile is unloaded for pleasure use at a remote location, the carrier need not be detached from the auto for any reason. Of course, the automobile can be driven with complete safety with the carrier unloaded; moreover, however, the luggage compartment is completely accessible as a result of the pivotal nature of the lowermost mounting means 24 and the intermediate pivot or hinge means 22, which allows the support deck to hinge and which provides for considerably easier handling of the carrier when not attached to the auto, as well as for easier pivoting thereof on the lower mount 24.

Thus, a very great number of advantages and benefits are provided by the present carrier, which is intended for a purpose completely different from other "car-top" carriers used for boats, luggage, and the like.

It is entirely conceivable that upon examining the foregoing disclosure, those skilled in the art may devise particular embodiments of the concepts forming the basis of the invention which differ somewhat from the preferred embodiment shown and described herein, or may make various changes in structural details to the present embodiment. Consequently, it is to be recognized that the preferred embodiment shown and described is for purposes of general illustration only and is in no way intended to illustrate all possible forms of the invention.

The embodiments of the invention in which an exclusive property or privilege is claimed are defined as follows.

1. A snowmobile carrier for autos, comprising: a support deck means including a primary portion providing a pair of spaced and generally rigid lateral trackways for receiving and supporting the runner means at the front of a snowmobile and also including a secondary portion having a central trackway aligned between said lateral trackways for receiving and supporting the drive means of a snowmobile; and mounting means disposed generally beneath said support deck means, for attaching the same to an auto; said mounting means including lower support members for positioning said primary portion at the extreme rear of the auto and upper support members for positioning said secondary portion forwardly of said primary portion with respect to said auto.

2. The snowmobile carrier of claim 1, wherein said mounting means is structured such that it attaches said support deck means to said auto in a manner whereby said deck means slopes generally downwardly toward the rear of the auto and said primary portion is positioned well below the roof level of such auto, such that the heavy front part of the snowmobile is carried low and to the rear of the auto.

3. The snowmobile carrier of claim 1, including a hinge means between said primary and secondary portions of said support deck means, said hinge means interconnecting said portions in a relatively pivotal manner.

4. The snowmobile carrier of claim 1, wherein said lower support members comprise pivot-forming elements providing a pivotal attachment between said auto and said primary portion.

5. The snowmobile carrier of claim 4, including a hinge means between said primary and secondary portions of said support deck means, said hinge means interconnecting said portions in a relatively pivotal manner.

6. The snowmobile carrier of claim 1, further including loading ramp means carried by said primary portion and providing an outward extension thereof.

7. The snowmobile carrier of claim 6, wherein said loading ramp means comprises extensions of said lateral trackways.

8. The snowmobile carrier of claim 7, wherein said loading ramp extensions are slidably carried on said primary portion.

9. The snowmobile carrier of claim 5, wherein said mounting means is structured such that it attaches said support deck means to said auto in a manner whereby said deck means slopes generally downwardly toward the rear of the auto and said primary portion is positioned well below the roof level of such auto, such that the heavy front of the snowmobile is carried low and to the rear of the auto.

10. A snowmobile carrier for autos, comprising: a support deck means including a primary portion providing a pair of spaced lateral trackways for receiving and supporting the runner means at the front of a snowmobile and also including a secondary portion having a trackway for receiving and supporting the drive means of a snowmobile; guide means for guiding such snowmobile runner means onto said lateral trackways and retaining the runner means in place thereon; and mounting means for attaching said support deck means in position generally atop an auto.

11. The snowmobile carrier of claim 10, wherein said guide means comprise rail portions carried over said primary portion.

12. The snowmobile carrier of claim 11, wherein said rail portions comprise raised rib elements extending lengthwise of said primary portion.

13. The snowmobile carrier of claim 12, wherein said rib elements are structural reinforcing members rigidly secured to said primary portion.

14. The snowmobile carrier of claim 10, wherein said mounting means is disposed at least in part generally beneath said support deck means, said mounting means including lower support members for positioning said primary portion at the extreme rear of the auto and upper support members for positioning said secondary portion forwardly of said primary portion with respect to said auto.

15. The snowmobile carrier of claim 10, wherein said mounting means is structured such that it attaches said support deck means to said auto in a manner whereby said deck means slopes generally downwardly toward the rear of the auto and said primary portion is positioned well below the roof level of such auto, such that the heavy front part of the snowmobile is carried low and to the rear of the auto.

16. The snowmobile carrier of claim 10, including a hinge means between said primary and secondary portions of said support deck means, said hinge means interconnecting said portions in a relatively pivotal manner.

17. The snowmobile carrier of claim 10, wherein said lower support members comprise pivot forming elements providing a pivotal attachment between said auto and said primary portion.

18. The snowmobile carrier of claim 17, including a hinge means between said primary and secondary portions of said support deck means, said hinge means interconnecting said portions in a relatively pivotal manner.

19. The snowmobile carrier of claim 18, wherein said mounting means is arranged to attach said support deck means to said auto such that said deck means slopes generally downwardly toward the rear of the auto and said primary portion is positioned well below the roof level of such auto, such that the heavy front of the snowmobile is carried low and to the rear of the auto.

20. The snowmobile carrier of claim 19, further including loading ramp means carried by said primary portion and providing an outward extension thereof.

21. A snowmobile carrier for autos, comprising: a support deck means including a primary portion providing a pair of spaced lateral trackways for receiving and supporting the runner means at the front of a snowmobile and also including a secondary portion having a trackway for receiving and supporting the drive means of a snowmobile; guide means for guiding said snowmobile drive means onto said trackway and for retaining such drive means in place thereon; and mounting means for attaching said support deck means in position generally atop an auto.

22. The snowmobile carrier of claim 21, wherein said guide means comprise rail portions carried over said secondary portion.

23. The snowmobile carrier of claim 22, wherein said rail portions comprise raised rib elements extending lengthwise of said secondary portion.

24. The snowmobile carrier of claim 23, wherein said rib elements are structural reinforcing members rigidly secured to said secondary portion.

25. A snowmobile carrier for autos, comprising: a support deck means including a primary portion providing a pair of spaced lateral trackways for receiving and supporting the runner means at the front of a snowmobile and also including a secondary portion having a trackway for receiving and supporting the drive means of a snowmobile; guide means for guiding both said snowmobile runner means onto said lateral trackways and retaining the runner means in place thereon and for guiding said snowmobile drive means onto said trackway and for retaining such means in place thereon; and mounting means for attaching said support deck means in position generally atop an auto.

References Cited
UNITED STATES PATENTS

| | | | |
|---|---|---|---|
| 3,333,750 | 8/1967 | Porter | 224—29 |
| 3,437,248 | 4/1969 | Allen | 224—42.1 |

ROBERT G. SHERIDAN, Primary Examiner

U.S. Cl. X.R.

214—85.1; 224—42.08, 42.1